United States Patent
Nalepka et al.

(10) Patent No.: US 6,503,583 B2
(45) Date of Patent: Jan. 7, 2003

(54) VACUUM IG WINDOW UNIT WITH FIBER INCLUSIVE EDGE SEAL

(75) Inventors: Raymond Nalepka, Westland, MI (US); Scott V. Thomsen, Milford, MI (US); Ksenia A. Landa, Grosse lle, MI (US); Leonid M Landa, Grosse lle, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 13 days.

(21) Appl. No.: 09/759,644

(22) Filed: Jan. 16, 2001

(65) Prior Publication Data

US 2001/0012545 A1 Aug. 9, 2001

Related U.S. Application Data

(63) Continuation-in-part of application No. 09/440,697, filed on Nov. 16, 1999, now Pat. No. 6,436,492.

(51) Int. Cl.$^7$ ............... E06B 3/24; C03C 27/00; E04C 2/54
(52) U.S. Cl. ............... 428/34; 156/109; 52/786.13
(58) Field of Search .......... 428/34, 192; 52/786.1, 52/786.13; 156/107, 109

(56) References Cited

U.S. PATENT DOCUMENTS

| | | | |
|---|---|---|---|
| 49,167 A | | 1/1865 | Stetson |
| 1,370,974 A | | 3/1921 | Kirlin |
| 1,448,351 A | | 3/1923 | Kirlin |
| 1,774,860 A | | 9/1930 | Wendler et al. |
| 2,011,557 A | * | 8/1935 | Anderegg ............ 428/34 |
| 2,077,305 A | * | 4/1937 | Batchell ............ 428/34 |
| 2,962,409 A | | 11/1960 | Ludlow et al. |
| 3,441,924 A | | 4/1969 | Peek et al. |
| 3,742,600 A | | 7/1973 | Lowell |
| 3,902,883 A | | 9/1975 | Bayer |
| 3,912,365 A | | 10/1975 | Lowell |
| 3,936,553 A | | 2/1976 | Rowe |
| 4,064,300 A | | 12/1977 | Bhangu |
| 4,130,408 A | | 12/1978 | Crossland et al. |
| 4,130,452 A | | 12/1978 | Indri |
| 4,305,982 A | | 12/1981 | Hirsch |
| 4,486,482 A | | 12/1984 | Kobayashi et al. |
| 4,514,450 A | | 4/1985 | Nowobilski et al. |
| 4,683,154 A | | 7/1987 | Benson et al. |
| 4,786,344 A | | 11/1988 | Beuther |

(List continued on next page.)

FOREIGN PATENT DOCUMENTS

| FR | 2483564 | 6/1980 |
|---|---|---|
| FR | 2 482 161 | 11/1981 |

OTHER PUBLICATIONS

U.S. application Ser. No. 09/440,697 filed Nov. 16, 1999.
"Current Status of the Science and Technology of Vacuum Glazing" by Collin, et al., Solar Energy, vol. 62, No. 3, pp. 189–213, 1998.
"Temperature–Induced Stresses in Vacuum Glazing: Modelling and Experimental Validation" by Simko, et. al., Solar Energy, vol. 63, No. 1, pp. 1–21, 1998.
"Fabrication of Evacuated Glazing at Low Temperature" by Griffiths, et. al., Solar Energy, vol. 63, No. 4, pp. 243–249, 1998.
"Thermal Outgassing of Vacuum Glazing" by Lenzen, et.al., School of Physics, Univ. of Sydney, NSW 2006, Australia.

Primary Examiner—Donald J. Loney
(74) Attorney, Agent, or Firm—Nixon & Vanderhye P.C.

(57) ABSTRACT

A vacuum insulating glass (IG) unit and method of making the same. An edge seal of the vacuum IG unit includes at least one fiber (e.g. elongated glass fiber) provided at least partially between first and second opposing substrates in order to hermetically seal off a low pressure space between the substrates. A plurality of spacers are located between the substrates to space the substrates from one another and maintain the low pressure space therebetween.

17 Claims, 5 Drawing Sheets

U.S. PATENT DOCUMENTS

| | | | |
|---|---|---|---|
| 4,824,215 A | | 4/1989 | Joseph et al. |
| 4,874,461 A | | 10/1989 | Sato et al. |
| 4,924,243 A | | 5/1990 | Sato et al. |
| 4,983,429 A | | 1/1991 | Takayanagi et al. |
| 5,124,185 A | * | 6/1992 | Kerr et al. .................... 428/34 |
| 5,157,893 A | | 10/1992 | Benson et al. |
| 5,175,975 A | | 1/1993 | Benson et al. |
| 5,234,738 A | | 8/1993 | Wolf |
| 5,247,764 A | | 9/1993 | Jeshurun et al. |
| 5,315,797 A | | 5/1994 | Glover et al. |
| 5,399,406 A | | 3/1995 | Matsuo et al. |
| 5,489,321 A | | 2/1996 | Tracy et al. |
| 5,499,128 A | | 3/1996 | Hasegawa et al. |
| 5,596,981 A | | 1/1997 | Soucy |
| 5,657,607 A | | 8/1997 | Collins et al. |
| 5,664,395 A | | 9/1997 | Collins et al. |
| 5,739,882 A | | 4/1998 | Shimizu et al. |
| 5,834,891 A | | 11/1998 | Novich |
| 5,855,638 A | | 1/1999 | Demars |
| 5,891,536 A | | 4/1999 | Collins et al. |
| 5,902,652 A | | 5/1999 | Collins et al. |
| 6,049,370 A | | 4/2000 | Smith, Jr. et al. |
| 6,212,852 B1 | | 4/2001 | Tsai |

* cited by examiner

VACUUM IG WINDOW UNIT WITH FIBER INCLUSIVE EDGE SEAL

This is a continuation-in-part (CIP) of U.S. patent application Ser. No. 09/440,697, now U.S. Pat. No. 6,436,492 filed Nov. 16, 1999, the disclosure of which is hereby incorporated herein by reference.

This invention relates to a vacuum insulating glass (IG) unit, and a method of making the same. More particularly, this invention relates to a vacuum IG unit including a glass fiber inclusive edge seal.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Figure 1:
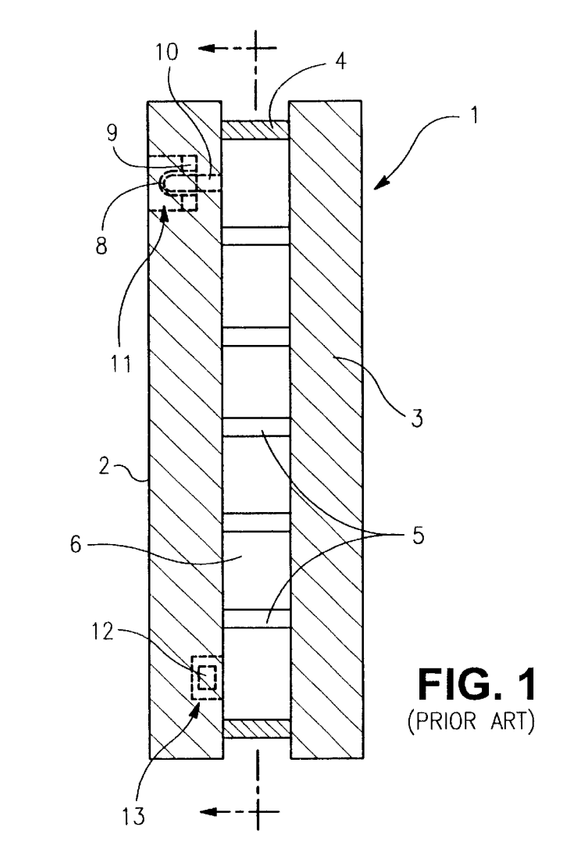
FIG. 1 is a prior art cross-sectional view of a conventional vacuum IG unit.
Figure 2:
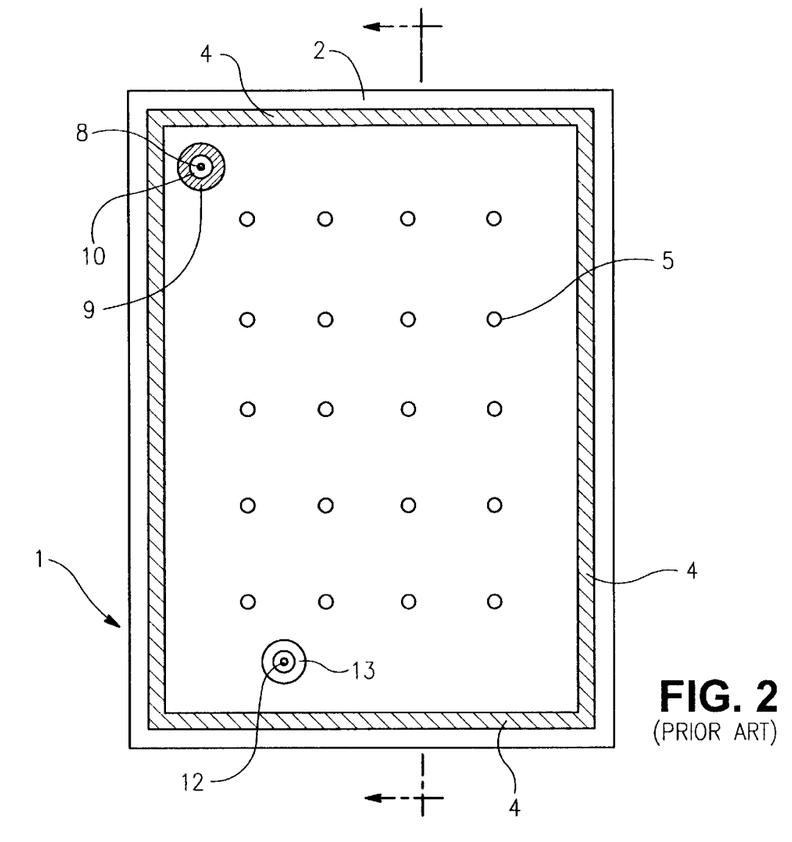
FIG. 2 is a prior art top plan view of the FIG. 1 vacuum IG unit, taken along the section line illustrated in FIG. 1 with the peripheral or edge seal being shown in cross-section.

Prior art FIGS. 1–2 illustrate a conventional vacuum IG unit. IG unit 1 includes two spaced apart sheets of glass 2 and 3 which enclose an evacuated or low pressure space 6 therebetween. Glass sheets 2 and 3 are interconnected by peripheral or edge seal of fused solder glass 4 and an array of support pillars or spacers 5.

Pump out tube 8 is sealed by solder glass 9 to an aperture or hole 10 which passes from an interior surface of glass sheet 2 to the bottom of recess 11. A vacuum is attached to tube 8 so that the cavity between sheets 2 and 3 can be evacuated to create a low pressure area 6 between the opposing glass substrates. After evacuation, tube 8 is melted to seal the vacuum. Recess 11 retains melted and sealed tube 8. Chemical getter 12 may be included within machined recess 13.

Edge seal 4 is often made from solder glass in conventional vacuum IG units. For example, see U.S. Pat. No. 5,902,652. As explained in the '652 patent, the solder glass edge seal is formed by depositing the solder glass as a liquid slurry onto the surface of one or both of the glass sheets 2, 3. The sheets are brought together and the entire unit is then heated to a temperature at which the solder glass melts, wets the surface of the glass sheets, and flows to produce a hermetic seal 4 between the sheets 2 and 3. While solder glass edge seals work well, they may be viewed by some as disadvantageous in that the aforesaid slurry is required during the manufacturing process, which may tend to be somewhat messy in certain circumstances.

It is also known to use indium inclusive edge seals 4. Unfortunately, the use of indium may tend to cause the edge seal 4 to be undesirably weak from a mechanical perspective in certain instances. Additionally, indium tends to be rather expensive and is undesirable for this reason as well.

It is apparent from the above that there exists a need in the art for a vacuum IG unit, and corresponding method of making the same, including an improved edge seal between opposing glass sheets or substrates. There also exists a need in the art for a fiber inclusive edge seal for use in vacuum IG window units.

This invention will now be described with respect to certain embodiments thereof, accompanied by certain illustrations.

SUMMARY OF THE INVENTION

An object of this invention is to provide a vacuum insulating glass (IG) unit including a glass fiber inclusive edge seal. The edge seal may include one or more glass fibers in certain embodiments of this invention. For example, in one embodiment a single fiber may be used to form the edge seal with the fiber's opposing ends being fused (or otherwise attached) together at an interface or junction in order to complete the hermetic edge seal. In another embodiment, a plurality of elongated glass fibers may be bundled together, with respective ends of the bundle being fused together at an interface or junction in order to complete the edge seal. In still further embodiments, a plurality of glass fibers may be aligned with one another in series to form the edge seal, with ends of adjacent fibers being fused (or otherwise attached) to one another to complete the edge seal.

Another object of this invention is to provide a vacuum IG window unit including one or more elongated glass fiber spacers for use in an edge seal of the IG window unit.

Another object of this invention is to provide a vacuum IG window unit including a glass fiber inclusive edge seal having an index of refraction approximately the same as (i.e. within about 15% of) the index of refraction of at least one of the glass substrates.

Another object of this invention is to fulfill one or more of the above-listed objects.

Generally speaking, this invention fulfills one or more of the above described objects and/or needs by providing a thermally insulating glass panel comprising:

first and second spaced apart glass substrates defining a low pressure space therebetween having a pressure less than atmospheric pressure;

a plurality of spacers disposed between said first and second glass substrates in order to space the substrates from one another; and     at least one elongated fiber inclusive hermetic edge seal disposed at least partially between said first and second glass substrates for hermetically sealing said low pressure space.

This invention further fulfills one or more of the above-listed objects and/or needs in the art by providing a vacuum IG window unit comprising:

first and second spaced apart substrates having a low pressure space therebetween with a pressure less than atmospheric pressure;

a plurality of spacers disposed between said first and second substrates for spacing said substrates from one another; and     an edge seal including at least one elongated fiber disposed between said first and second substrates for sealing said low pressure space.

This invention still further fulfills one or more of the above-listed objects and/or needs by providing a method of making a vacuum insulating glass (IG) window unit, the method comprising:

providing first and second glass substrates;

positioning a plurality spacers on the first substrate;

positioning at least one elongated glass fiber on the first substrate at least partially at an edge seal location;

sandwiching the at least one elongated glass fiber and the spacers between the first and second glass substrates;

heating at least an edge seal area so as to form an edge seal including the at least one elongated glass fiber; and     evacuating a space between the first and second substrates so that the space has a pressure less than atmospheric pressure.

DETAILED DESCRIPTION OF CERTAIN EMBODIMENTS OF THIS INVENTION

Referring now more particularly to the accompanying drawings in which like reference numerals indicate like parts throughout the several views.

Certain embodiments of this invention relate to a vacuum IG window unit including an elongated fiber (e.g., glass fiber) inclusive edge seal and/or a method of making the same. Optionally, fiber spacers and/or any other type of spacers may also be provided between the opposing glass substrates. "Peripheral" and "edge" seals herein do not mean that the edge seals are located at the absolute periphery of the unit, but instead mean that the edge seal is at least partially located at or near (e.g. within about two inches) an edge of at least one substrate of the unit.

Figure 7:
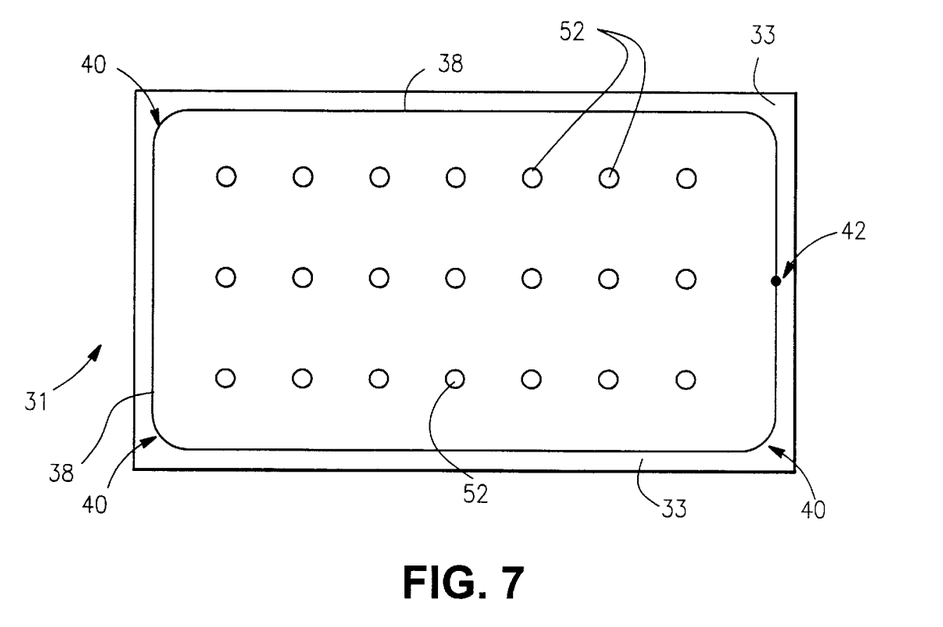
FIG. 7 is a top plan view of a vacuum IG window unit absent its upper substrate according to an embodiment of this invention, wherein a glass fiber inclusive edge seal is provided.
Figure 8:
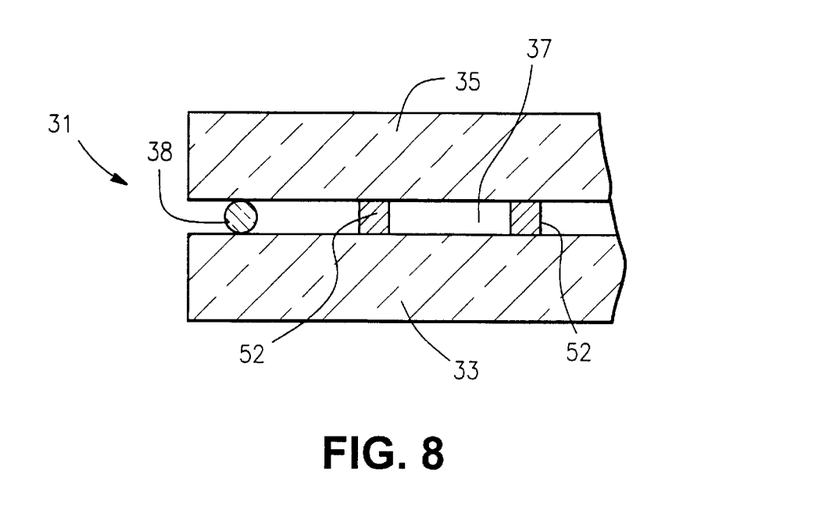
FIG. 8 is a partial side cross sectional view of a portion of the vacuum IG window unit of FIG. 7, illustrating a portion of a glass fiber inclusive edge seal.

FIGS. 7–8 illustrate a thermally insulating glass panel 31 according to an embodiment of this invention (note: the upper substrate 35 is not shown in FIG. 7 for purposes of simplicity). Because interior space 37 between the opposing substrates 33, 35 is at a pressure lower or less than atmospheric in general, this type of panel is often referred to as a vacuum insulating glass (IG) unit.

Referring to FIGS. 7–8, vacuum IG unit or panel 31 includes first glass substrate 33, second glass substrate 35, low pressure or evacuated space 37 between substrates 33 and 35, spacers 39 for spacing the substrates 33, 35 from one another and supporting them, an optional pump out tube (not shown) disposed in a hole or aperture formed in substrate 33 for evacuating space 37, and elongated glass or mineral fiber inclusive peripheral or edge seal 38 that hermetically seals low pressure space 37 between substrates 33, 35 and which may bond the substrates to one another or hold them together. Substrates 33, 35 are substantially transparent to visible light (i.e. at least about 70% transparent, more preferably at least about 80% transparent, and most preferably at least about 90% transparent) in certain embodiments of this invention; although they may be deeply tinted in other embodiments. Edge seal 38 may be located entirely between the opposing substrates 33 and 35 as shown in FIG. 8, or alternatively only partially between the substrates if the edge seal should happen to bulge or be squeezed outwardly to some degree during manufacture.

Vacuum IG units 31 according to different embodiments of this invention may be used as residential or commercial windows. The evacuation of space 37 eliminates or reduces heat transport between glass substrates 33 and 35 due to gaseous conduction and convection. In addition, radiative heat transport between glass sheets 33 and 35 can be reduced to a low level by providing a low emissivity (low-E) coating(s) on the internal surface of one or both of sheets 33, 35. High levels of thermal insulation can thus be achieved. While the pressure in low pressure space 37 is generally less than atmospheric pressure, in certain embodiments the pressure in space 37 is reduced to a level equal to or below about $0.5 \times 10^{-3}$ Torr, more preferably below about $0.1^{-4}$ Torr, or $10^{-4}$ Torr, and most preferably below about $10^{-6}$ Torr of atmospheric pressure. Edge seal 38 reduces or eliminates any ingress or outgress of gas or air to/from low pressure space 37.

Figure 9:
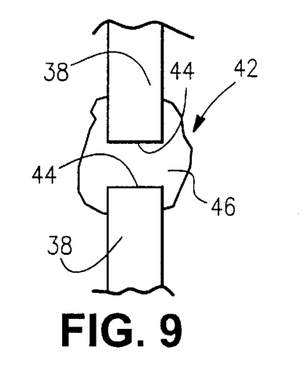
FIG. 9 is a top plan view of the junction or interface portion of the fiber inclusive edge seal of FIGS. 7–8, illustrating opposing ends of an elongated glass fiber fused or otherwise connected to one another in order to complete the hermetic edge seal.

According to certain embodiments of this invention, e.g., as shown in FIGS. 7–8, edge seal 38 may include at least one elongated fiber (e.g., glass fiber, mineral fiber, or any other suitable type of fiber). In the FIGS. 7–8 embodiment for example, the edge seal is made up of a single elongated glass fiber 38 that extends along/around or proximate the edge of the substrates 33, 35 and is bent at corner areas 40. The fiber 38 is generally round/circular in cross section as illustrated, although it may be shaped differently (e.g., extruded to have an oval, rectangular, square, or trapezoidal cross section). The two ends of the single fiber 38 are fused or otherwise bonded to one another at junction or interface 42 in order to complete the hermetic edge seal. FIG. 9 is a close-up top view illustrating the ends 44 of the single fiber of FIGS. 7–8 hermetically connected or attached to one another via an adhesive 46 such as solder glass, glass, glue, or any other suitable adhesive/bonding material.

Figure 11:
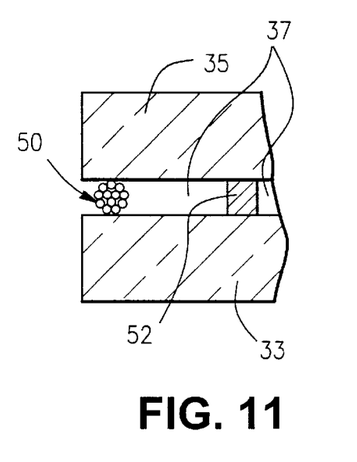
FIG. 11 is a partial side cross sectional view of a portion of the vacuum IG window unit of another embodiment of this invention, which is the same as the FIGS. 7–8 embodiment except that in this embodiment the hermetic edge seal includes a bundle of elongated fibers instead of a single fiber.

In another embodiment of this invention shown in FIG. 11, the hermetic edge seal 50 does not just include a single elongated fiber as in the FIGS. 7–9 embodiment, but instead includes a bundle including a plurality of elongated glass fibers. The plurality of glass inclusive fibers in edge seal bundle 50 may be woven together, attached together, or may be aligned approximately parallel to one another in different embodiments of this invention.

In any of the embodiments of FIGS. 7–11, the glass fiber inclusive edge seal (38 or 50) may include a single elongated piece (a "piece" herein may include only a single fiber 38 or a bundle of fibers 50) that is flexible so that when laid down on a substrate (e.g., on substrate 33) the flexible edge seal can be bent at corner areas 40 and the two ends of the piece can be connected (e.g., fused together as in FIG. 9) at junction 42 as discussed above. Alternatively, the glass fiber inclusive edge seal piece (38 or 50) may be pre-bent and fused (i.e., to be more rigid) prior to being laid down on a substrate 33 so that it is in the shape shown in FIG. 7 even prior to being laid down on the substrate. In still further embodiments of this invention, the glass fiber inclusive edge seal (38 or 50) may include a plurality of approximately coaxially aligned pieces having adjacent ends fused to one another so as to form the overall edge seal (i.e., in this embodiment, there would be a plurality of junctions 42—one between each set of adjacent pieces) so that the overall edge seal may include from about 2–100 fibers having adjacent ends connected throughout its length.

In certain embodiments, in the FIGS. 7–8 embodiment for example, a fiber 38 of the edge seal may be circular in cross section (prior to being sandwiched between the substrates) and have a diameter from about 0–100% greater than the desired gap/space size/distance between substrates 33 and 35 (e.g., more preferably from about 10–50% greater, and most preferably from about 15–30% greater than the desired gap/space). Thus, for example, the fiber 38 may have a height, diameter, or thickness of from about 0.05 to 0.30 mm, which thus determines or relates to the thickness of low pressure space 37 between the substrates. When the fiber is sandwiched between the two substrates and pressure is applied, the cross-sectional shape of the fiber may change, e.g., from a circular cross sectional shape to an oval cross sectional shape. In certain preferred embodiments, the fiber(s) of the edge seal (38 or 50) may be of or include glass fibers (e.g. silica fibers, multi-component glass fibers, fiber glass, or the like). In such embodiments, the fibers include glass and optionally glass-forming or modifying components. In certain embodiments, the fiber(s) may be of a glass fiber material such as that used by Guardian Fiberglass, Albion, Michigan. For example, the glass fiber(s) for the edge seal in the FIGS. 7–11 embodiments may comprises soda lime silica glass, and optionally may or may not be doped with a material (e.g., lead) to reduce the softening point of the fiber to help simplify manufacturing processes. The fibers may be clear or substantially transparent in certain embodiments, but may take on a yellowish color in other embodiments (e.g., lead or other doping may cause such a yellowish color).

Figure 10:
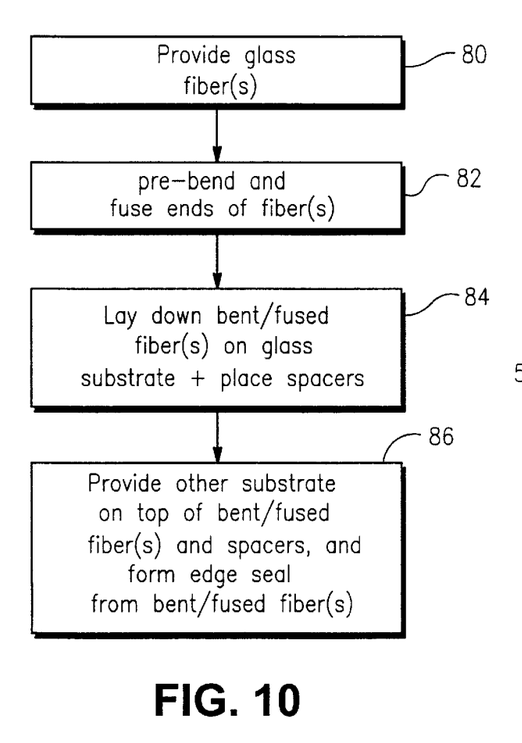
FIG. 10 is a flowchart illustrating steps taken according to an embodiment of this invention where the FIGS. 7–9 vacuum IG window unit is made.

In FIGS. 7–8 and 10, it can be seen that a plurality or an array of spacers 52 is provided between the substrates 33, 35 to space them from one another. Spacers 52 may be circular in shape, cylindrical in shape, rectangular in shape, oval in shape, round in shape, or linearly elongated in shape in different embodiments of this invention. Spacers 52 may be made of, for example, glass, sapphire, steel, glass fibers (see FIGS. 3–6 described below), or any other suitable material in different embodiments of this invention.

FIG. 10 is a flowchart illustrating steps taken in manufacturing the vacuum IG unit according to an example of the FIGS. 7–9 embodiment of this invention. First, the glass fiber(s) for the edge seal is/are provided in step 80. The fiber(s) may or may not be pre-bent in different embodiments of this invention. In certain embodiments, the fiber(s) may be pre-bent and the ends thereof fused using solder glass or glass material 46 in step 82. The pre-bent and fused fiber(s) with its two ends attached to one another is then laid down on the interior surface of substrate 33 in step 84 to come up with the structure of FIG. 7 (in certain exemplary embodiments, the fiber may be laid down on the surface of substrate 33 such that a low-E coating may be provided on the surface of the substrate 33 is located between the fiber(s) and the substrate itself 33; this optional low-E coating may or may not be edge deleted to help bonding of the edge seal fiber(s) in different embodiments of this invention). Spacers 52 are also laid down on the substrate 33. Then, in step 86, the other substrate 35 is then brought and laid down over substrate 33 so that spacers 52 and the fiber(s) for the edge seal are sandwiched between the two substrates 33, 35. At least the area of the edge seal 38 is then heated (e.g., via conventional IR oven, via microwave heating, via high frequency radio wave heating, or the like) in order to cause the fiber(s) 38 to fuse with the substrates 33, 35 thereby forming the hermetic edge seal. In certain exemplary embodiments, the fiber(s) for the edge seal may be heated to about 1200–1500 degrees F in this step. After the hermetic edge seal 38, 50 is formed, the interior space between the substrates is evacuated so as to form low pressure space 37 between the substrates that is sealed off by the fiber inclusive edge seal.

Figure 12A:
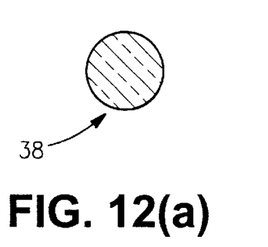
FIG. 12(a) is a cross sectional view of an exemplary elongated fiber (e.g., glass fiber) which may be used in an edge seal in any of the embodiments of FIGS. 7–11.
Figure 12B:
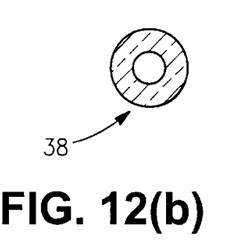
FIG. 12(b) is a cross sectional view of an exemplary elongated fiber (e.g., glass fiber) that is hollow or tubular in cross section, and which may be used in an edge seal in any of the embodiments of FIGS. 7–11.

FIGS. 12(a) and 12(b) are cross sectional views of exemplary fibers (e.g., glass fibers) which may be used in edge seals 38, 50 according to any of the embodiments of FIGS. 7–11. The fibers may be substantially solid or solid on cross section (FIG. 12(a)), or alternatively may be tubular or hollow when viewed cross sectionally (FIG. 12(b)). The aperture, hole or cavity in the fibers of FIG. 12(b) may enhance squeezing/deformation of the fiber(s) in the edge seal when subject to the pressure of the two substrates sandwiching around same (e.g., when the two substrates are squeezed together, the fiber may be squeezed into a more oval shape from an original circular shape) when the upper substrate is brought down on the lower substrate and the fiber(s) squeezed therebetween; this may enhance the thermal resistance of the edge seal in certain embodiments.

According to another embodiment of this invention, the spacers between the substrates 33 and 35 may include fibers, as will be explained below.

Figure 3:
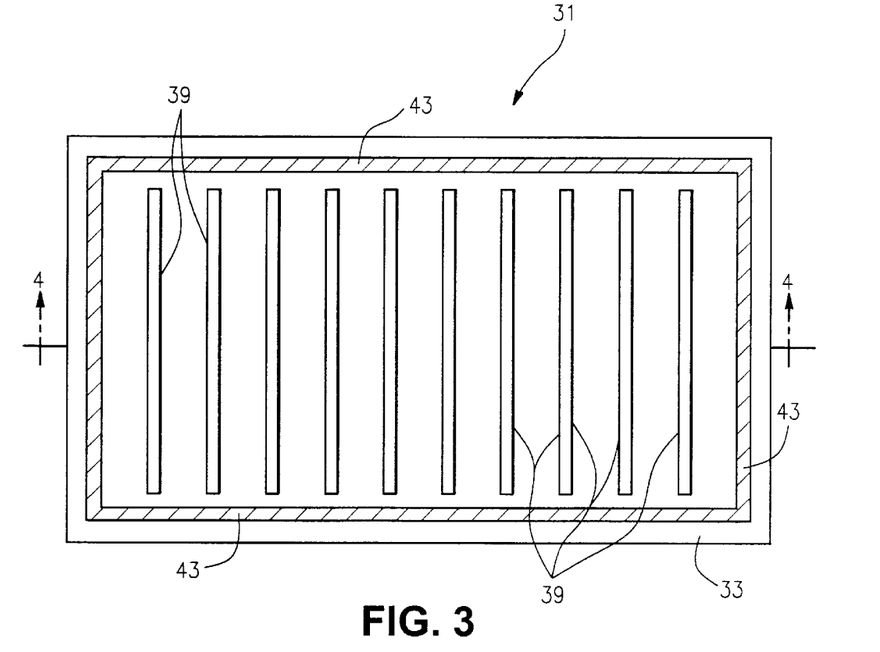
FIG. 3 is a top partial cross-sectional and partial elevation view of a vacuum IG window unit absent its upper substrate according to an embodiment of this invention wherein glass fibers are used as spacers.
Figure 4:
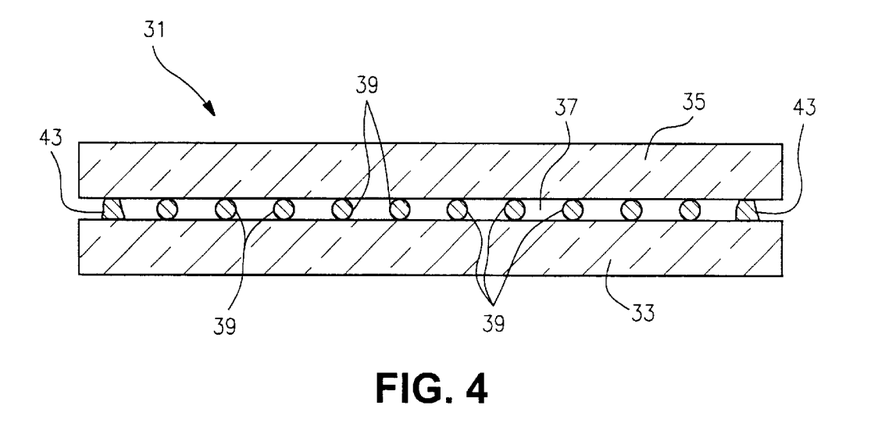
FIG. 4 is a side cross-sectional view of the FIG. 3 vacuum IG window unit taken along section line 4—4(including the upper substrate).

FIGS. 3–4 illustrate a thermally insulating glass panel 31 according to an embodiment of this invention (note: the upper substrate is not shown in FIG. 3 for purposes of simplicity) including fiber inclusive spacers. Vacuum IG unit or panel 31 includes first glass substrate 33, second glass substrate 35, low pressure or evacuated space 37 between substrates 33 and 35, elongated mineral fiber or strand spacers 39 for spacing the substrates 33, 35 from one another and supporting them, an optional pump out tube (not shown) disposed in a hole or aperture formed in substrate 33 for evacuating space 37, and peripheral or edge seal 43 that hermetically seals low pressure space 37 between substrates 33, 35 and which may bond the substrates to one another or hold them together. Edge seal 43 may be fiber inclusive as discussed above, or alternatively may be of solder glass or any other material.

In embodiments of this invention when a pump-out tube or other pump-out structure is utilized, the substrates are assembled around spacers 39 and edge seal 43 formed; and thereafter a vacuum is hooked up to the pump-out tube in order to evacuate sealed off space 37. In alternative embodiments where no pump-out tube is used, the vacuum IG unit 31 may be assembled in a vacuum chamber so that when edge seal 43 is formed the sealed off space 37 is already in an evacuated state.

Referring to FIGS. 3–4, an array of elongated fiber spacers 39 is provided between substrates 33 and 35 in order to maintain separation of the two approximately parallel glass sheets 33 and 35 against atmospheric pressure. Fiber spacers 39 are horizontally aligned or oriented in low pressure space 37 between the substrates, so that they are aligned approximately perpendicular to the direction of normal light flow through vacuum IG window unit 31. In certain embodiments, each pillar may have a height, diameter, or thickness of from about 0.05 to 0.30 mm, which thus determines or relates to the thickness of low pressure space 37.

During manufacturing of vacuum IG unit 31, glass fiber spacers 39 may be fused onto substrates 33 and/or 35. In alternative embodiments, fibers 39 may be adhered to the substrate(s) 33, 35 by ion diffusion/exchange. Glass fiber spacers 39 may be fused to the opposing substrates during the formation of solder glass edge seal 43 or at any other suitable time during the manufacturing process. Alternatively, spacers 39 may have a low friction diamond-like carbon (DLC) or other coating thereon so as to be at least partially slidable relative to the glass substrate(s) in the final product.

As shown in FIGS. 3–4, the plurality of approximately parallel elongated fibers 39 function as spacers which maintain separation of substrates 33 and 35. The shape and distribution of fiber spacers 39 across the viewing area of window unit 31 enables the loading or weight distribution to be approximately evenly distributed across the interior major surfaces of the substrates under evacuation of space 37.

In certain preferred embodiments, spacers 39 may be of or include glass fibers (e.g. silica fibers, multi-component glass fibers, fiber glass, or the like). In such embodiments, spacers 39 include glass and optionally glass-forming or modifying components. In certain embodiments, fiber spacers 39 may be of a glass fiber material such as that used by Guardian Fiberglass, Albion, Mich.

Thermal properties of the spacer material which are of significance in vacuum IG units, such as thermal expansion coefficient and temperatures related to the glass transition interval, may be controlled and/or adjusted by varying the glass composition makeup of fibers 39. For example, the hardness of glass fibers 39 may be approximately the same as that of substrates 33 and 35, thereby reducing the potential for point or contact scratching, shear, and/or indentation damage to substrate(s) 33 and 35 by the spacers when or after space 37 is evacuated. Glass fibers or strands 39 conduct little heat between the opposing substrates.

Moreover, the thermal expansion coefficient of multi-component glass fibers 39 may be designed to closely match that of substrates 33 and 35, again reducing the likelihood of substrate(s) 33, 35 cracking. Another advantage of the use of glass fibers as spacers 39 is that such fibers may be substantially transparent to visible light, and have a refractive index approximately the same (i.e. within about 15% plus/minus) as the refractive index of glass substrate(s) 33 and 35. These characteristics render glass fibers 39 more invisible to viewers in the viewing area of window unit 31 than conventional opaque metal or ceramic spacers. In sum, many aesthetic characteristics of vacuum IG unit 31 may be improved through the utilization of elongated glass fibers 39 as spacers.

In still further embodiments of this invention, elongated fiber spacers 39 (or 38, 50) may be made of or include the minerals brucite and/or chrysotile. These materials may also be substantially transparent to certain wavelengths of visible light in some embodiments.

Figure 5:
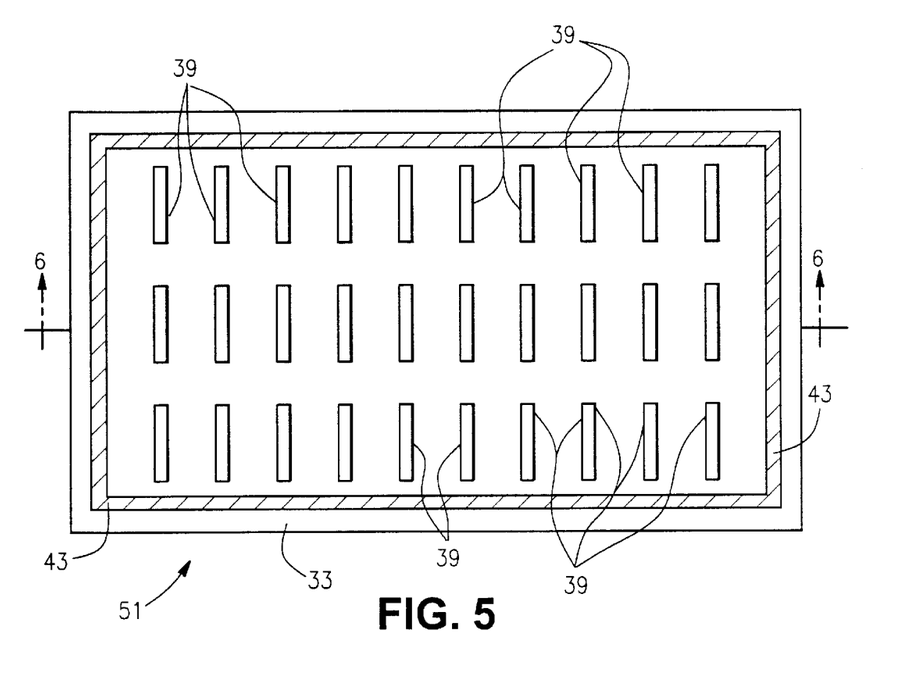
FIG. 5 is a top partial cross-sectional and partial elevation view of a vacuum IG window unit absent its upper substrate according to another embodiment of this invention wherein glass fiber spacers are used in the IG window unit.
Figure 6:
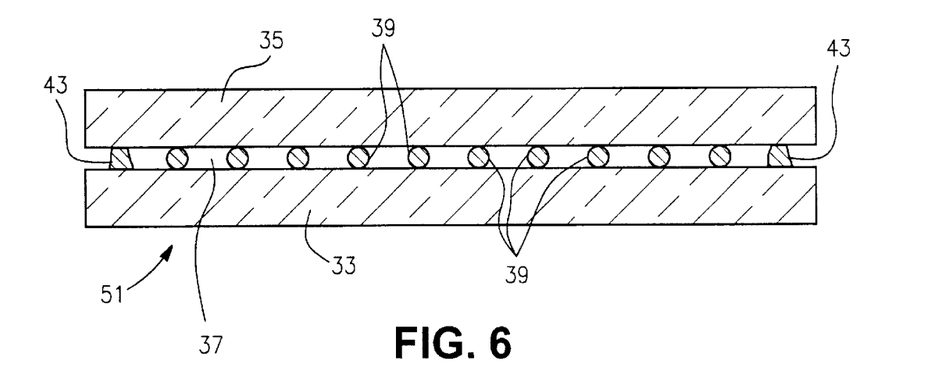
FIG. 6 is a side cross-sectional view of the FIG. 5 vacuum IG window unit taken along section line 6—6 (including the upper substrate).

FIGS. 5–6 illustrate a vacuum IG unit 51 according to another embodiment of this invention. This embodiment is similar to the embodiment of FIGS. 3–4, except that in FIGS. 5–6 additional and shorter elongated fiber spacers 39 are provided. In FIGS. 5–6, fiber spacers 39 are provided in a plurality of aligned rows and columns across the viewing area of window unit 51 to space the substrates 33 and 35 from one another against atmospheric pressure. Fiber spacers 39 provided in the same column are thus aligned approximately coaxial to one another, while many spacers 39 in the same and different rows are aligned approximately parallel to one another in this embodiment.

In still another embodiment of this invention, a plurality of fiber spacers 39 may be randomly distributed or positioned across at least a portion of the viewing area of the window unit between glass substrates 33 and 35. However, fiber spacers 39 are preferably oriented so as to not overlap one another between the substrates 33 and 35. A random distribution of fibers 39 may decrease costs associated with production of the vacuum IG unit.

Elongated fibers 39 are oriented in a horizontal (or laid down) position and maintain the gap of low pressure space 37. However, in alternative embodiments of this invention, each of a plurality of spacers may be comprised of a plurality of fibers bunched or adhered together (e.g. a spacer may be comprised of a member including multiple glass fibers bonded or otherwise adhered to one another in the shape of a sphere, rectangle, cylinder, or the like).

In preferred embodiments of this invention, glass substrates or sheets 33, 35 are thermally or chemically tempered prior to the step of sandwiching the spacers/pillars therebetween. However, in alternative embodiments, glass substrates 35, 35 need not be tempered.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A thermally insulating glass panel comprising:
   first and second spaced apart glass substrates defining a low pressure space therebetween having a pressure less than atmospheric pressure;
   a plurality of spacers disposed between said first and second glass substrates in order to space the substrates from one another; and
   at least one elongated glass fiber inclusive hermetic edge seal disposed at least partially between said first and second glass substrates for hermetically sealing said low pressure space, said glass fiber contacting at least one of said glass substrates.

2. The glass panel of claim 1, wherein said edge seal is substantially transparent to at least certain wavelengths of visible light.

3. The glass panel of claim 1, wherein said edge seal comprises a bundle of elongated glass fibers.

4. The glass panel of claim 1, wherein said elongated fiber is bent at corner areas of the edge seal which substantially correspond to corner areas of the glass panel.

5. The glass panel of claim 4, wherein opposite ends of said elongated fiber are bonded to one another at a junction or interface area in order to complete the edge seal.

6. The glass panel of claim 1, wherein said fiber comprises at least one of:
   silica based glass, brucite and chrysotile.

7. The glass panel of claim 1, wherein said edge seal has one of an approximately circular cross section, an approximately rectangular cross section, and an approximately oval cross section when located at least partially between the substrates.

8. A thermally insulating glass panel comprising:
   first and second spaced apart glass substrates defining a low pressure space therebetween having a pressure less than atmospheric pressure;
   a plurality of spacers disposed between said first and second glass substrates in order to space the substrates from one another;
   at least one elongated fiber inclusive hermetic edge seal disposed at least partially between said first and second glass substrates for hermetically sealing said low pressure space, and
   wherein said edge seal is transparent to at least about 70% of certain wavelengths of visible light.

9. The glass panel of claim 8, wherein said edge seal is transparent to at least about 90% of all wavelengths of visible light.

10. A thermally insulating glass panel comprising:
   first and second spaced apart glass substrates defining a low pressure space therebetween having a pressure less than atmospheric pressure;
   a plurality of spacers disposed between said first and second glass substrates in order to space the substrates from one another;
   at least one elongated fiber inclusive hermetic edge seal disposed at least partially between said first and second glass substrates for hermetically sealing said low pressure space, and
   wherein a refractive index of said edge seal is approximately equal to a refractive index of at least one of said glass substrates.

11. A vacuum IG window unit comprising:
   first and second spaced apart substrates having a low pressure space therebetween with a pressure less than atmospheric pressure;
   a plurality of spacers disposed between said first and second substrates for spacing said substrates from one another; and
   an edge seal including at least one elongated glass fiber disposed between and contacting said first and second substrates for sealing said low pressure space.

12. The window unit of claim 11, wherein said substrates are glass substrates.

13. The window unit of claim 11, wherein said edge seal comprises a bundle of elongated fibers.

14. A method of making a vacuum insulating glass (IG) window unit comprising:
   providing first and second glass substrates;
   positioning a plurality spacers on the first substrate;
   positioning at least one glass fiber on and contacting the first substrate at least partially at an edge seal location;
   sandwiching the at least one glass fiber and the spacers between the first and second glass substrates so that the glass fiber contacts at least the first substrate;
   heating at least an edge seal area so as to form an edge seal including the at least one glass fiber so that the glass fiber fuses with at least the first substrate; and
   evacuating a space between the first and second substrates so that the space has a pressure less than atmospheric pressure.

15. The method of claim 14, wherein the glass fiber is elongated in shape, and wherein the method further comprises bending the fiber into a shape of an edge seal at the time of or after the fiber is positioned on the first substrate.

16. The method of claim 14, further comprising bending and fusing the glass fiber into a shape of an edge seal prior to positioning the fiber on the first substrate.

17. A vacuum IG window unit comprising:
   first and second spaced apart substrates having a low pressure space therebetween with a pressure less than atmospheric pressure;
   a plurality of spacers disposed between said first and second substrates for spacing said substrates from one another; and
   an edge seal including at least one glass fiber disposed between and contacting said first and second substrates for sealing said low pressure space.

* * * * *